US009922272B2

(12) United States Patent
Cheng et al.

(10) Patent No.: US 9,922,272 B2
(45) Date of Patent: Mar. 20, 2018

(54) DEEP SIMILARITY LEARNING FOR MULTIMODAL MEDICAL IMAGES

(71) Applicant: Siemens Healthcare GmbH, Erlangen (DE)

(72) Inventors: Xi Cheng, Seattle, WA (US); Li Zhang, Skillman, NJ (US); Yefeng Zheng, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 115 days.

(21) Appl. No.: 14/865,565

(22) Filed: Sep. 25, 2015

(65) Prior Publication Data

US 2016/0093048 A1 Mar. 31, 2016

Related U.S. Application Data

(60) Provisional application No. 62/055,121, filed on Sep. 25, 2014.

(51) Int. Cl.
G06K 9/00 (2006.01)
G06K 9/66 (2006.01)
G06K 9/62 (2006.01)
G06T 7/30 (2017.01)

(52) U.S. Cl.
CPC ............ *G06K 9/66* (2013.01); *G06K 9/6215* (2013.01); *G06K 9/6289* (2013.01); *G06T 7/30* (2017.01); *G06T 2207/10072* (2013.01); *G06T 2207/20081* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS

2011/0170781 A1* 7/2011 Bronstein ............ G06K 9/6289
382/190
2015/0112182 A1* 4/2015 Sharma ................ A61B 5/0261
600/408
2017/0093849 A1* 3/2017 Wang .................... A61B 5/021

OTHER PUBLICATIONS

Hierarchical Feature Representation and Multimodal Fusion with Deep Learning for AD/MCI Diagnosis Heung-Il Suk1, Seong-Whan Lee2, Dinggang Shen1 Nov. 1, 2014.*

(Continued)

*Primary Examiner* — Nancy Bitar

(57) ABSTRACT

The present embodiments relate to machine learning for multimodal image data. By way of introduction, the present embodiments described below include apparatuses and methods for learning a similarity metric using deep learning based techniques for multimodal medical images. A novel similarity metric for multi-modal images is provided using the corresponding states of pairs of image patches to generate a classification setting for each pair. The classification settings are used to train a deep neural network via supervised learning. A multi-modal stacked denoising auto encoder (SDAE) is used to pre-train the neural network. A continuous and smooth similarity metric is constructed based on the output of the neural network before activation in the last layer. The trained similarity metric may be used to improve the results of image fusion.

17 Claims, 5 Drawing Sheets

(56) References Cited

OTHER PUBLICATIONS

Hierarchical Feature Representation and Multimodal Fusion with Deep Learning for AD/MCI Diagnosis Heung-Il Suk1, Seong-Whan Lee2, Dinggang Shen1,2,, and the Alzheimers Disease Neuroimaging Initiative† Hueng et al. Nov. 1, 2014.*
Bronstein, Michael M., et al. "Data fusion through cross-modality metric learning using similarity-sensitive hashing." Computer Vision and Pattern Recognition (CVPR), 2010 IEEE Conference on. IEEE, 2010.
Lee, Daewon, et al. "Learning similarity measure for multi-modal 3D image registration." Computer Vision and Pattern Recognition, 2009. CVPR 2009. IEEE Conference on. IEEE, 2009.
Michel, Fabrice, et al. "Boosted metric learning for 3D multi-modal deformable registration." Biomedical Imaging: From Nano to Macro, 2011 IEEE International Symposium on. IEEE, 2011.

* cited by examiner

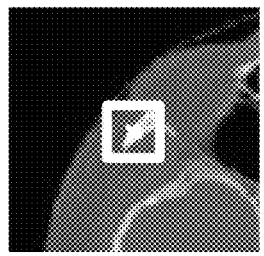 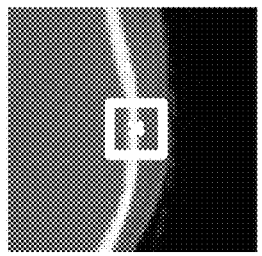
FIG. 5A (CT)   FIG. 6A (CT)
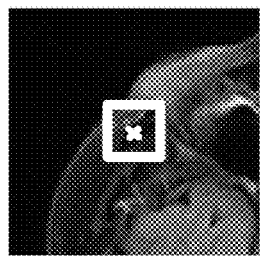 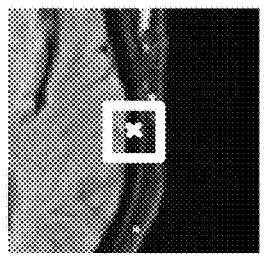
FIG. 5B (MR)   FIG. 6B (MR)
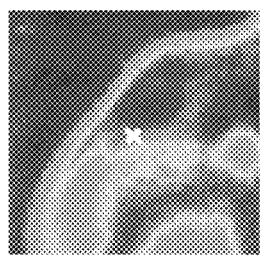 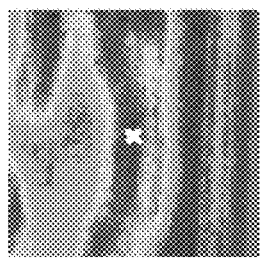
FIG. 5C (NMI)   FIG. 6C (NMI)
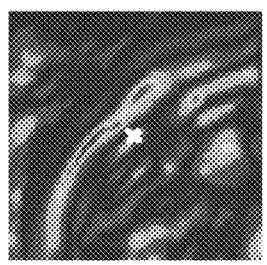 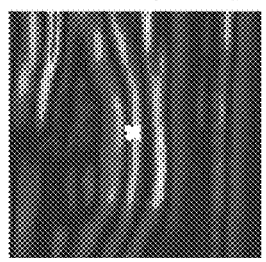
FIG. 5D (LCC)   FIG. 6D (LCC)
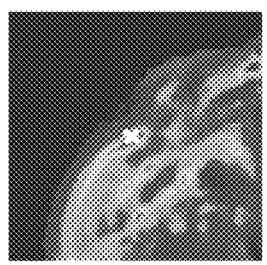 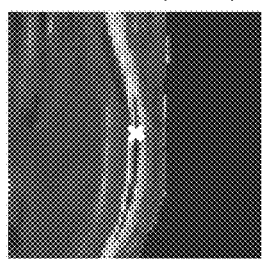
FIG. 5E   FIG. 6E

US 9,922,272 B2

DEEP SIMILARITY LEARNING FOR MULTIMODAL MEDICAL IMAGES

CROSS-REFERENCE TO RELATED APPLICATIONS

The present patent document claims the benefit of U.S. Patent Application No. 62/055,121, filed on Sep. 25, 2014, which is hereby incorporated by reference.

BACKGROUND

An effective measure of the similarity between multimodal medical images is important in many clinical applications, such as for multi-modal image registration. Universal similarity metrics are used to estimate the similarity between different unimodal image data sets based on the statistics of the image intensity distribution, such as using local cross-correlation (LCC), mutual information (MI), entropy correlation coefficient (ECC), cumulative residual entropy correlation coefficient (CRECC) or the Kullback-Leibler (KL) divergence between the observed and a prior learned joint image intensity distribution. Universal similarity metrics have been successfully used for unimodal image analysis where the different unimodal image data is similar in terms of both intensity and texture. However, universal similarity metrics are insufficient to describe the complex relationship between different imaging modalities that have very different underlying imaging physics.

To overcome this insufficiency, supervised similarity metric learning was developed. In contrast to the universal similarity metrics discussed above, supervised learning optimizes a similarity metric, usually in a parametric form, using a set of training data. The similarity metric is trained for a specific application. One approach uses a support vector machine (SVM) based method and joint kernel maps for modeling nonlinear dependencies between image patches from different modalities. Another approach uses similarity sensitive hashing for embedding image data of different modalities into a common metric space. The common metric space is then used to parameterize a multimodal similarity metric.

Data representation is important to machine learning algorithms because different data representations signify very different factors that explain the variation in the image data. Hand-engineered image features, however, are not guaranteed to work well for all image data. Therefore, learning based methods have been developed to learn (shared) feature representation for unimodal data, for data from different imaging modalities, and different data sources (e.g., image and audio).

SUMMARY

The present embodiments relate to similarity metric learning for multimodal image data. By way of introduction, the present embodiments described below include apparatuses and methods for learning a similarity metric using deep learning based techniques for multimodal medical images. A novel similarity metric for multimodal images is provided using the corresponding states of pairs of image patches to generate a classification setting for each pair. The classification settings are used to train a deep neural network via supervised learning. A multimodal stacked denoising auto encoder (SDAE) and a denoising auto encoder are used to pre-train the deep neural network. A continuous and smooth similarity metric is constructed based on the output of the deep neural network before sigmoid activation in the last layer. The trained similarity metric may be used to improve the results of image fusion.

In a first aspect, a method for similarity metric learning for multimodal medical image data is provided. The method includes receiving a first set of image data of a volume captured with a first imaging modality and receiving a second set of image data of the volume captured with a second imaging modality. The first set of image data and the second set of image data are aligned rigidly. A first set of parameters are trained with a multimodal stacked denoising auto encoder to generate a shared feature representation of the first set of image data and the second set of image data. A second set of parameters are trained with a denoising auto encoder to generate a transformation of the shared feature representation. A deep neural network classifier is initialized using the first set of parameters and the second set of parameters. The deep neural network classifier is trained using the aligned first set of image data and the second set of image data to generate a similarity metric for the first and second imaging modalities.

In a second aspect, a system for similarity learning for multimodal medical image data is provided. The system includes a first scanner configured to capture a first set of image data of a volume with a first imaging modality and a second scanner configured to capture a second set of image data of the volume with a second imaging modality. The system also includes a server configured to receive the first set of image data and the second set of image data from the first scanner and the second scanner over a network. The server is configured to rigidly align the first set of image data and the second set of image data. The server is configured to train a first set of parameters with a multimodal stacked denoising auto encoder to generate a shared feature representation of the first set of image data and the second set of image data. The server is configured to train a second set of parameters with a denoising auto encoder to generate a transformation of the shared feature representation. The server is configured to initialize a deep neural network classifier using the first set of parameters and the second set of parameters, and to train the deep neural network classifier to generate a similarity metric for the first and second imaging modalities using the aligned first set of image data and the second set of image data.

In a third aspect, a method for image registration is designed using similarity learning for multimodal medical image data. The method includes receiving a first set of image data captured of a volume using a first imaging modality from a first scanner and receiving a second set of image data captured of the volume using a second imaging modality from a second scanner. A processor identifies which voxels from the first set of image data that correspond to the same position in the volume as voxels from the second set of image data using a trained similarity metric for multimodal image data, and performs image fusion on the first set of image data and the second set of image data using the identified voxels.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the FIGS. 1A-1B illustrate an embodiment of similarity metric learning for multimodal medical image data.

FIGS. 5A-5E illustrate an example of a comparison of local similarity values for multimodal images.

FIGS. 6A-6E illustrate another example of a comparison of local similarity values for multimodal images.

DETAILED DESCRIPTION OF EXEMPLARY EMBODIMENTS

Figure 1A:
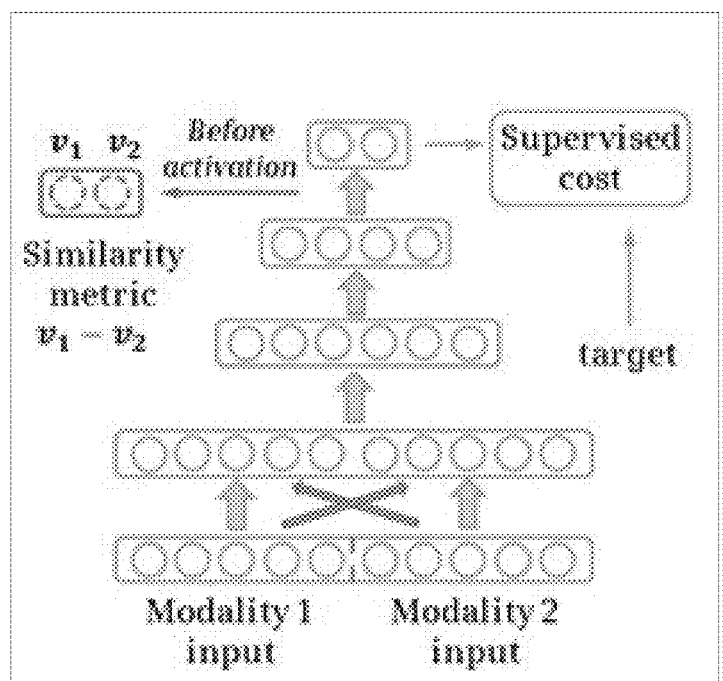

The present embodiments model the nonlinear and complex relationship between imaging modalities using a deep neural network based structure. The deep neural network is trained to generate a similarity metric for the two imaging modalities. For example, a five layer deep neural network is provided. The two-unit output is used for supervised training. The two-unit output values before activation in the output layer (i.e., v1 and v2) are used to form the similarity metric. The bottom three layers of the deep neural network are initialized using a multimodal stacked denoising auto encoder (SDAE) and the fourth layer of the deep neural network is initialized using a denoising auto encoder (DAE).

An auto encoder (AE) is trained to encode an input x (e.g., image data) into a hidden representation y (e.g., a feature representation), such that x can be decoded or reconstructed from the hidden representation y. The hidden layer is encoded by a nonlinear one-layer neural network, such as using equation 1:

$$y = \varphi(x) = s(Wx + b) \qquad \text{Eq. 1}$$

where $\varphi$ represents the hidden layer, s is the transformation, W is a matrix and b is a vector offset. These parameters are trained by the auto encoder. The hidden layer is decoded to generate a reconstruction of x from the hidden representation y, such as using equation 2:

$$z = \psi(y) = s(W'y + c) \qquad \text{Eq. 2}$$

The reconstruction z has the same size as x and the transformation s(•) is a nonlinear activating function (e.g., sigmoid function).

A denoising auto encoder (DAE) is an extension of the auto encoder discussed above. A denoising auto encoder is trained to reconstruct a clean or "repaired" version of a noisy input. A noisy version of x is constructed, denoted as $\tilde{x}$, through a stochastic mapping, such as using equation 3:

$$\tilde{x} \sim q(x) \qquad \text{Eq. 3}$$

where q(•) can be any function to add noise into the input x. For example, masking noise is used where a certain fraction of randomly chosen image data points of input x are set to 0. The noisy input $\tilde{x}$ is mapped using the auto encoder to encode a hidden representation y, such as using equation 4:

$$y = \varphi(\tilde{x}) \qquad \text{Eq. 4}$$

The hidden representation y is decoded to reconstruct a clean version of input $\tilde{x}$, such as using equation 5:

$$z = \psi(y) \qquad \text{Eq. 5}$$

A stacked denoising auto encoder (SDAE) stacks several auto encoders into layers of auto encoders. Each of the stacked auto encoders are trained separately in a layerwise manner (i.e., the input of a high-level denoising auto encoder is the output from the lower-level denoising auto encoder from the previous layer). The input of the stacked denoising auto encoder can be concatenated image data from two modalities to model the correlation between the two image modalities. However, it may be difficult to encode the hidden connections (e.g., nodes) in the first hidden layer with fully connected input data due to the highly non-linear relationship between the two imaging modalities.

To overcome this limitation, a multi-modal stacked denoising auto encoder is used. Instead of concatenating the image data in the first layer, the multimodal stacked denoising auto encoder applies a denoising auto encoder to the image data for each imaging modality separately first. By applying independent denoising auto encoders to the image data separately for each imaging modality, the higher level feature representations of the image data is generated and used in correlation modeling (i.e., rather than using the raw imaging data itself). The higher level feature information is much more similar across imaging modalities than the raw image data, thus the correlation modeling becomes much easier. The obtained feature representations of the two input images are concatenated as input for the next level denoising auto encoder.

Figure 1B:
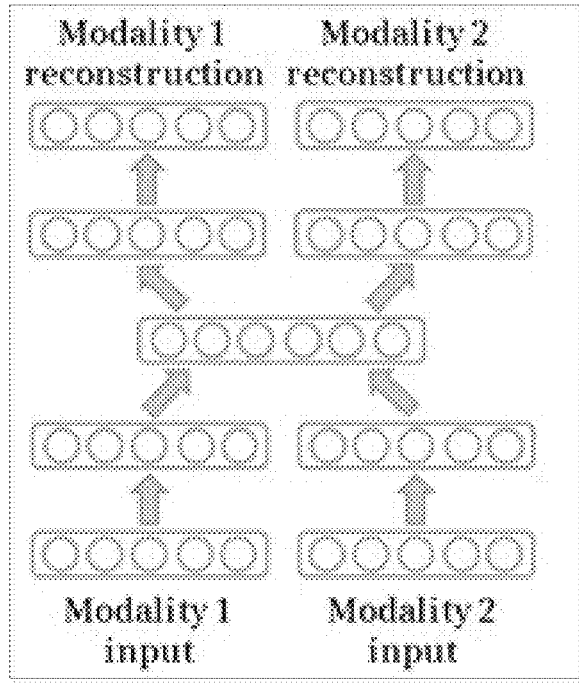

FIGS. 1A and 1B illustrate an embodiment of similarity metric learning for multimodal medical image data. Referring to FIG. 1B, image data for modality 1 and modality 2 are input to the bottom level of the stacked denoising auto encoder. In this example, each image data set is provided for a 17 by 17 pixel image comprising 289 data points. Each data set is input to an independent denoising auto encoder that encodes the data set into feature information comprising 289 data points. The output of the first level of the two independent denoising auto encoders (e.g., the 578 data points in total) are concatenated and used as input into the next level of denoising auto encoders. Additional levels may be provided in the stacked denoising auto encoder. For example, additional levels may be provided for a series of pretraining levels, enabling more complex models (e.g., more parameters) to be generated. The next level of denoising auto encoder encodes the 578 data points into a shared representation for the image data sets. The steps described above ensemble a multimodal stacked denoising auto encoder. The multimodal stacked denoising auto encoder intrinsically learns a shared representation for the input pair of images from different imaging modalities. The multimodal SDAE is effective in pre-training the deep neural network with input from two different modalities.

FIG. 1A depicts a deep neural network classifier. The neural network classifier is trained to determine whether the input image data pairs correspond to each other (e.g., whether the input image data pairs represent the same point in a volume). The neural network classifier is trained using corresponding training datasets (positive) and non-corresponding (negative) training datasets with ground-truth corresponding states. The neural network classifier is initialized by the multimodal stacked denoising auto encoder, via using the parameters trained by multimodal SDAE to initialize the connections in the bottom three layers of the deep neural network classifier (e.g., the parameters and connections of the bottom three layers of FIG. 1B are used in the bottom three layers of the deep neural network classifier of FIG. 1A).

As discussed above, the bottom two layers in the multimodal stacked denoising auto encoder are not fully connected. The deep neural network, however, is fully connected, as indicated by the arrows between the bottom two layers in FIG. 1(b). Prior to training the neural network using a traditional backpropogation method, the additional connections in deep neural network classifier are initialized with zeros. Initializing the bottom two layers of the deep neural network classifier using multimodal SDAE helps the deep neural network classifier to better achieve a global optima. The output layer of the deep neural network classifier has two units representing the classification result, referred to as the supervised cost (e.g., 1-0 for a corresponding input image pair or 0-1 for non-corresponding input image pair). This classification result output is compared to the label of the ground truth corresponding state of the input image pair for supervised learning. This supervised learning fine tunes the parameters in the neural network classifier using a traditional backpropagation method.

The deep neural network has a binary classification result (e.g., 1-0 for corresponding image data or 0-1 for non-corresponding image data) as an output. However, it may be necessary to provide a continuous similarity metric for the input image data pairs. For example, image registration needs a continuous similarity value for optimization. To provide a continuous similarity, the similarity values before the activation of the output layer are extracted to generate a continuous similarity metric (equivalent to applying a monotone non-linear transformation on the discrete output). Referring back to FIG. 1A, values are extracted before the sigmoid activation (i.e., $v_1$ and $v_2$). The extracted similarity values are used directly to provide a continuous similarity metric. The value $v_1$ encodes the probability that image patches correspond and $v_2$ encodes the probability that the image patch do not correspond. The continuous similarity metric is thus defined by $v_1$-$v_2$.

Figure 2:
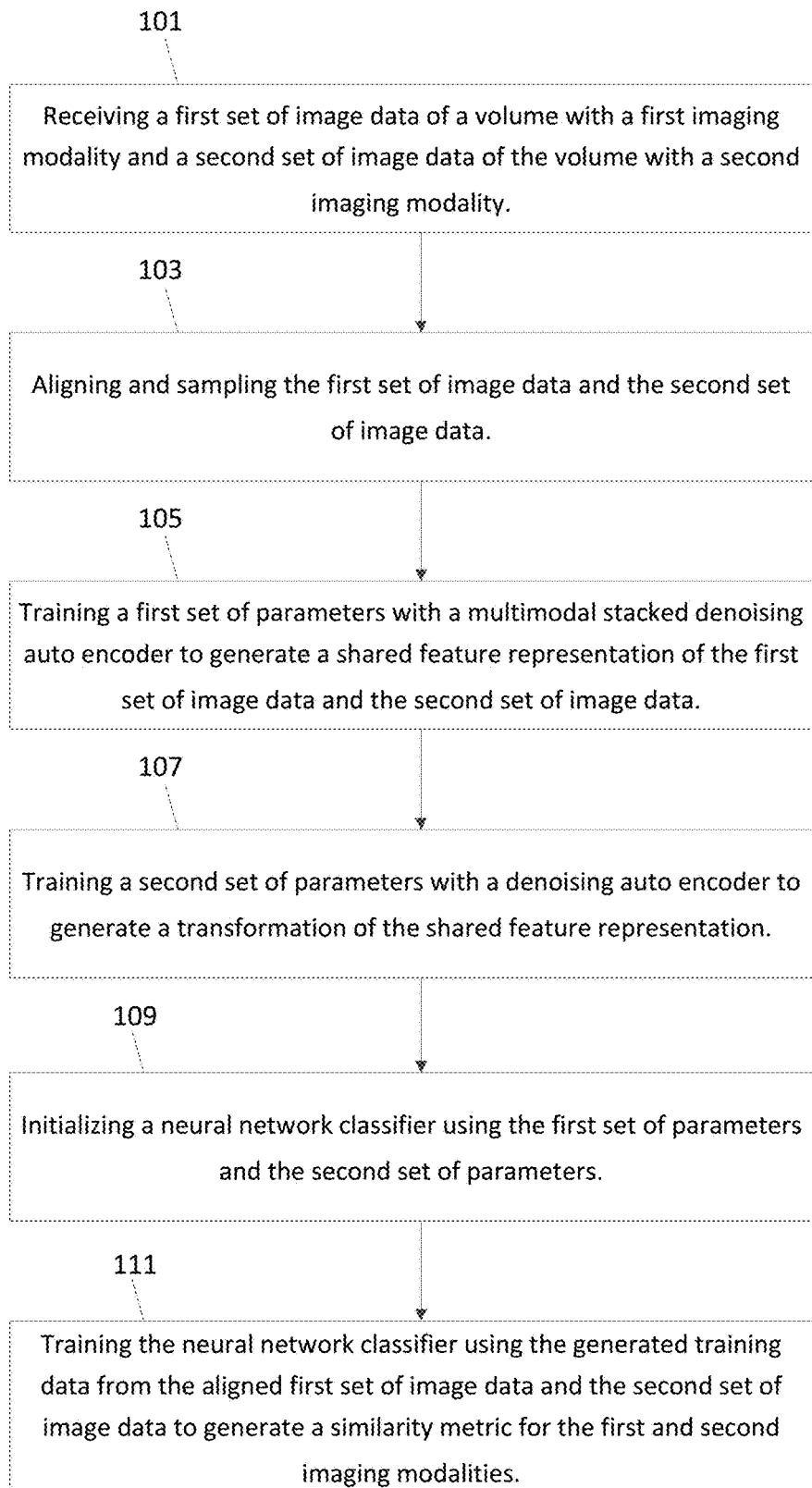
FIG. 2 illustrates a flowchart diagram of an embodiment of a method for similarity metric learning for multimodal medical image data.

FIG. 2 illustrates a flowchart diagram of an embodiment of a method for similarity metric learning for multimodal medical image data. The method is implemented by the system of FIG. 3 (discussed below) and/or a different system. Additional, different or fewer acts may be provided. For example, act 101 may be omitted or performed by a separate system. The method is provided in the order shown. Other orders may be provided and/or acts may be repeated. For example, acts 105 and 111 may be repeated.

At act 101, a first set of image data of a volume and a second set of image data of the volume are received. The image data sets are captured of the same subject (e.g., a patient or other volume). The first set of image data was captured using a first imaging modality (e.g., computed tomography imaging) and second set of image data was captured using a second imaging modality (e.g., magnetic resonance imaging). For example, the two sets of image data are acquired for a same subject (e.g., a patient or another object) using two different types of scanners. The data sets are from different medical imaging modalities. Any modalities may be used, such as ultrasound, computed tomography, x-ray, angiography, fluoroscopy, magnetic resonance, positron emission tomography, single photon emission computed tomography, or others.

At act 103, the first and second sets of input image data captured by the two different imaging modalities are rigidly aligned. Positive and negative training data (i.e., pairs of small image patches) is generated from the aligned two sets of image data. For example, the aligned data sets are sampled to obtain positive training datasets (i.e., corresponding pairs of small image data patches) and negative training datasets (i.e., non-corresponding pairs of small image data patches) for supervised learning. To obtain the positive and negative training data sets, the first and second image data sets (i.e., CT/MR images) are normalized to [0,1]. To obtain positive datasets (i.e., sampled data patches), patches from all positions of the registered pairs of image data can be extract, however extracting patches from all corresponding positions may lead to sampling too may training datasets to work with in the supervised training. Further, the similarity measurement is only informative in regions of the images with texture and edges, as opposed to homogeneous regions of the images. Therefore, the training dataset is sampled from patches centered on or around an area of interest (e.g., on or around the skull of the patient). However, obtaining negative training samples may require more consideration because there are far more non-corresponding positions (i.e., negative cases) than corresponding positions (i.e., positive cases). Thus, sampling all non-corresponding positions would make the computational efforts too expensive if each position was used during supervised training. Therefore, to obtain one negative training sample for each positive training sample, the second image data set (e.g., a MR data set) is randomly sampled to generate a negative patch (e.g., MR patch) for each patch from the first image data set (e.g., CT patch) in the positive training sample. Thus, the negative training data set the same size of the positive training data set. Further, as the sample patches are centered at a point of interest (e.g., centered at all skull voxels), the patches may be very similar. For example, some patches are simply translated or rotated versions of other patches. Therefore, the negative training dataset may present greater diversity than the positive dataset, increasing the discriminating power of the learned classifier.

At act 105, a first set of parameters are trained with a multimodal stacked denoising auto encoder to generate a shared feature representation of the first set of image data and the second set of image data. For example, a multimodal stacked denoising auto encoder is used to learn a shared feature representation of the input image pairs. The stacked denoising auto encoder includes two separate denoising auto encoders, one denoising auto encoder for each of the input images. Each auto encoder generates an image feature vector transformation for an input data set. The stacked denoising auto encoder also includes a third denoising auto encoder that receives concatenated feature vectors from the two separate denoising auto encoders. The third auto encoder generates a transformation of the concatenated image feature vectors. The result of this transformation is referred to as a shared feature representation of the two input image data sets. In this example, the combination of the three denoising auto encoders are referred to as the multimodal stack denoising auto encoder. Additional denoising auto encoders may be included in the multimodal stack denoising auto encoder.

At act 107, a second set of parameters are trained with a denoising auto encoder to generate a transformation of the shared feature representation. For example, a denoising auto encoder is applied to learn a transformation of the learned shared feature representation generated in act 105. The fourth denoising auto encoder generates a transformation of the shared feature representation.

At act 109, a neural network classifier is initialized using the first set of parameters and the second set of parameters. For example, a five-layer deep neural network is initialized by the parameters trained in act 105 and act 107. The parameters that are missing in act 105 and act 107 are initialized with zeros. In this example, the four denoising auto encoders (e.g., the three that are included in the multi-modal stack denoising auto encoder and the additional fourth denoising auto encoder) are able to train a lot of parameters (i.e., values are assigned to the parameters by the training process). To effectively train the deep neural network, the first three layers of the deep neural network are pretrained by parameters from the multi-modal stacked denoising auto encoder and the fourth layer of the deep neural network is pre-trained with parameters from the fourth denoising auto encoder.

At act 111, the neural network classifier is trained using the generated training data from the aligned first set of image data and the second set of image data to generate a similarity metric for the first and second imaging modalities. For example, the deep neural network is trained via supervised learning using all the positive and negative training dataset. The supervised cost, the difference between the model output with the training data as the input and the ground-truth label of the corresponding state of the training data, is the minimization target for the supervised learning. In this example, the positive and negative training datasets are used to train a five-layer deep neural network. The output layer, having two units, represents the classification result of the neural network (i.e., "10" for correspondence and "01" for noncorrespondence). The classification result is compared to the training label of the training image patches to drive the optimization of the model parameters. The sigmoid output of the learned binary neural network classifier, indicating the probability of being classified into a particular class, changes too fast between 0 and 1 for a similarity metric making the similarity values almost discrete. Thus, the similarity values are used directly before the final sigmoid activation. After the training stage, the absolute difference of the two values extracted before activation are used as the similarity score.

Figure 3:
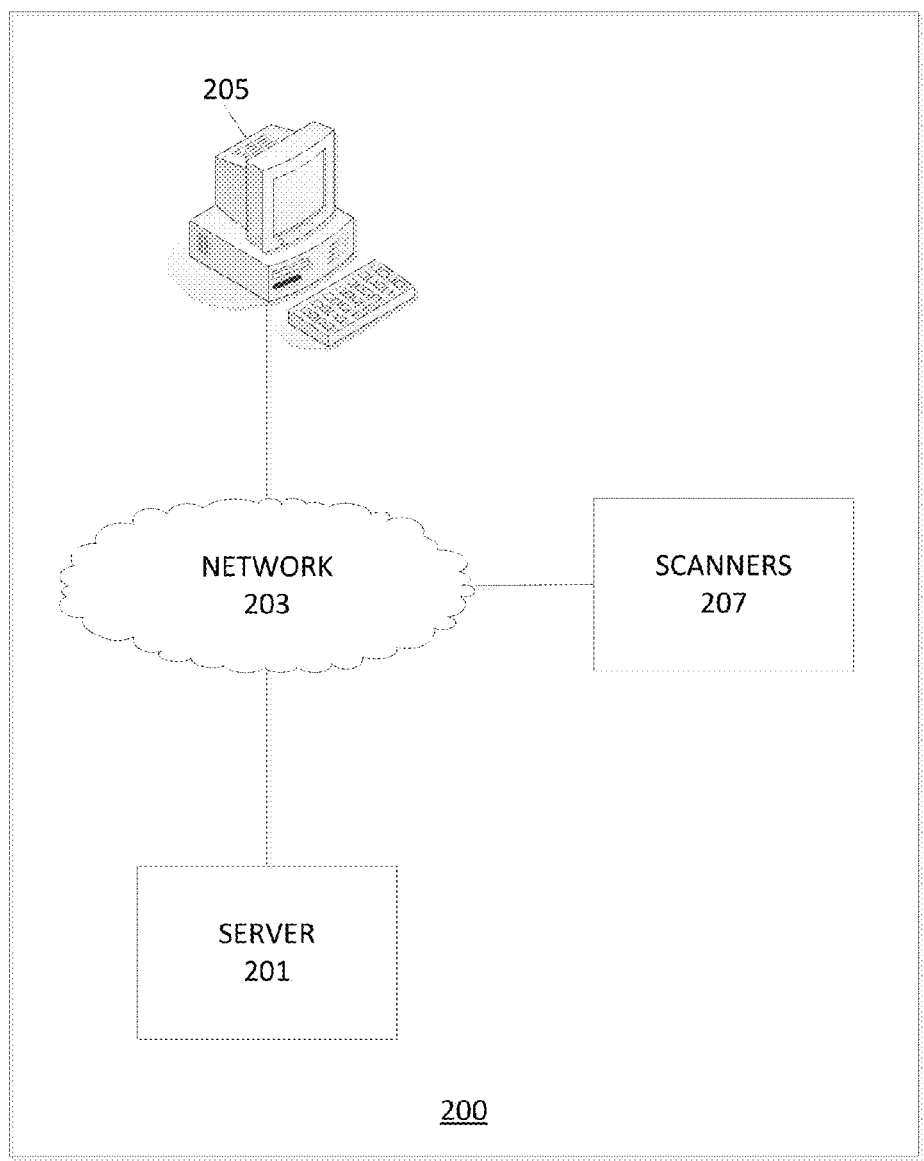
FIG. 3 illustrates an embodiment of a system for similarity metric learning for multimodal medical image data.

FIG. 3 illustrates an embodiment of a system for similarity learning or testing for multimodal medical image data. The system 200 includes a server 201, a network 203, workstations 205 and scanners 207. Additional, different, or fewer components may be provided. For example, additional servers 201, networks 203, workstations 205 and/or scanners 207 are used. In another example, the servers 201 and the workstation 205 are directly connected. Alternatively, the server 201 is not provided and the workstation 205 implements similarity learning. As another example, workstations 205 are part of the scanners 207.

The system 200 includes scanners 207 configured to capture a first set of image data of a volume with a first imaging modality (e.g., computed tomography) and a second set of image data of the volume with a second imaging modality (e.g., magnetic resonance). The scanners 207 are any type of scanners, such as a computerized tomography (CT), magnetic resonance (MR) scanners, ultrasound or x-ray. Other types of scanners may be used.

The system 200 includes a network 203. The network 203 is a wired or wireless network, or a combination thereof. Network 203 is configured as a local area network (LAN), wide area network (WAN), intranet, Internet or other now known or later developed network configurations. Any network or combination of networks for communicating between the workstations 205, scanners 207 and the server 201 may be used.

The system 200 includes server 201. The server 201 is a server computer platform having hardware such as one or more central processing units (CPU), a system memory, a random access memory (RAM) and input/output (I/O) interface(s). The server 201 also includes a graphics processor unit (GPU) to accelerate image rendering. The server 201 is implemented on one or more server computers connected to network 203. Additional, different or fewer components may be provided.

The server 201 is configured to execute an application to receive the first set of image data and the second set of image data from the scanners 207 over the network 203. The server 201 is configured to train a multimodal denoising auto encoder, a denoising auto encoder and a deep neural network. The server 201 may also be configured to execute the application to fine tune the parameters in the deep neural network. For example, the server 201 is configured to execute an application to rigidly align the first set of image data and the second set of image data, and the aligned data sets are sampled to obtain positive training datasets (i.e., corresponding pairs of small image data patches) and negative training datasets (i.e., non-corresponding pairs of small image data patches) for supervised learning. The server 201 is further configured to execute an application to train a first set of parameters with a multimodal stacked denoising auto encoder to generate a shared feature representation of the first set of image data and the second set of image data, and to train a second set of parameters with a denoising auto encoder to generate a transformation of the shared feature representation. The server 201 is also configured to execute an application to initialize a neural network classifier using the first set of parameters and the second set of parameters, and to train the neural network classifier to generate a similarity metric for the first and second imaging modalities using the aligned first set of image data and the second set of image data.

Figure 4:
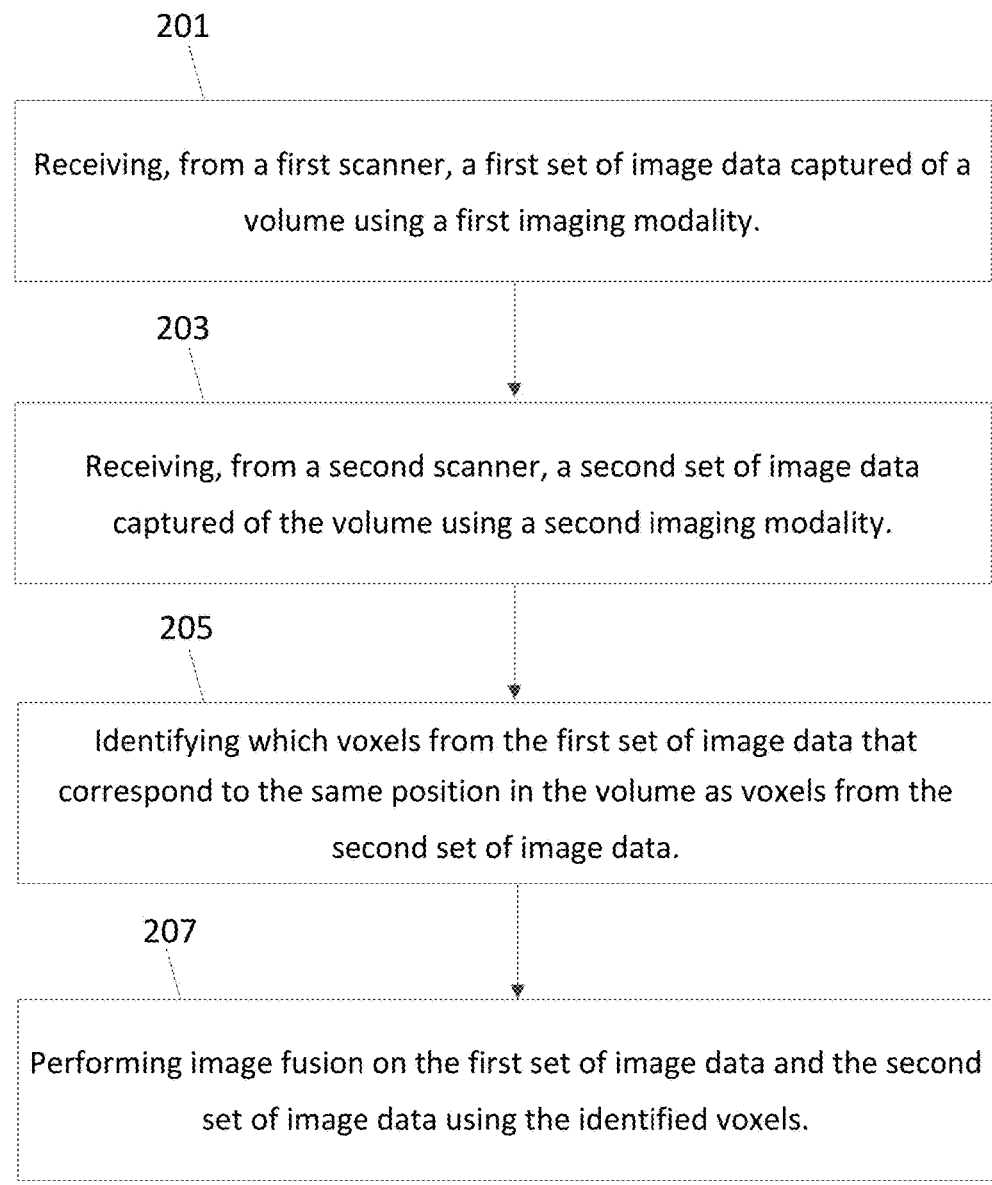
FIG. 4 illustrates a flowchart diagram of an embodiment of a method for image registration using similarity metric learning for multimodal medical image data.

FIG. 4 illustrates a flowchart diagram of an embodiment of a method for image registration using a similarity metric for multimodal medical image data. The method is implemented by the system of FIG. 3 and/or a different system. Additional, different or fewer acts may be designed. For example, acts 201 and 203 may be omitted or performed by a separate system. In another example, acts 201 and 203 may be combined into a single act. The method is provided in the order shown. Other orders may be provided and/or acts may be repeated. For example, acts 205 and 207 may be repeated. Further, the acts may be performed concurrently as parallel acts. For example, acts 201 and 203 may be performed concurrently. Acts 205 and 207 may also be performed concurrently.

At act 201, a first set of image data is received from a first scanner that was captured of a volume using a first imaging modality. At act 203, a second set of image data is received from a second scanner that was captured of the volume using a second imaging modality. For example, the first imaging modality is computed tomography and the second imaging modality is magnetic resonance. The data from both scanners is of a same patient, but acquired at different times. Alternatively, the data is acquired at a same time using a multi-modality scanner.

At act 205, voxels from the first set of image data are identified that correspond to the same position in the volume as voxels from the second set of image data using a trained similarity metric for multimodal image data. The similarity metric computes a similarity value for a pair of voxels in the reference image and the source image. For example, the similarity metric for multimodal image data is trained by a five layer deep neural network classifier. The neural network classifier is initialized by parameters from a multimodal stacked denoising auto encoder, and any missing parameters are initialized as zeros.

At act 207, image fusion is performed on the first set of image data and the second set of image data using the identified voxels. As discussed above, the similarity metric computes a similarity value for a pair of voxels in the reference image and the source image. The computed similarity value is used for optimization, which drives the image fusion.

FIGS. 5A-5E and 6A-6E illustrate an example of a comparison of local similarity values for multimodal images. A similarity metric generated by an embodiment was evaluated on corresponding CT and MR patches. The investigation of the assigned similarity scores illustrates an improvement of the new similarity metric over traditional statistics based metrics, such as NMI and LCC, in correctly finding corresponding image data.

For example, FIGS. 5A-5E and 6A-6E compare local similarity values of normalized mutual information (NMI) and local cross-correlation (LCC) with an embodiment of deep similarity learning. In the examples, an embodiment of deep similarity learning was trained using registered pairs of CT and MR images of a patient's head. Specifically, similarity between two-dimensional (2D) in-plane CT image data patches and MR image data patches of the patient's skull are determined, as the skull is a main visible volumetric structure in a CT of the patient's head. Corresponding CT and MR image data patches were used as a positive training dataset, and the same number of CT image patches and randomly selected non-corresponding MR image patches were used as negative training dataset.

After training the similarity metric, CT image patches are randomly selected and similarity scores are computed for all MR patches centered in an 81×81 neighborhood of the correct match. Two representative examples are provided for comparing the similarity metrics on similarity maps. FIGS. 5A and 6A depict reference CT images and FIGS. 5B and 6B depict images from source MR images. As depicted in FIGS. 5C-5E and 6C-6E, the 81×81 local similarity values are calculated for the CT patch (i.e., the 17×17 white box) and a MR patch within the neighborhood of the corresponding MR match. In this example, a reference CT image patch (e.g., the box in FIGS. 5A and 5A) are compared to a source MR image patch (e.g., the box in FIGS. 5B and 6B) that is moved through the MR image. The similarity values may be color coded (e.g., with red for high similarity values and blue for low similarity values), or in greyscale (e.g., with black for high similarity values and white for low similarity values). The similarity scores estimated by the trained similarity metric (FIGS. 5E and 6E) are compared to the similarity scores estimated by normalized mutual information (FIGS. 5C and 6C, respectively) and local cross-correlation (FIGS. 5D and 6D, respectively). The trained similarity metric has a unique maxima for the correct match, centering at the white cross marked voxel (FIGS. 5E and 6E), and assigns the similarity score that is consistent with the visual similarity check performed by a human. In contrast, the similarity scores for from normalized mutual information (FIGS. 5C and 6C) and local cross-correlation (FIGS. 5D and 6D) techniques do not provide a unique maxima for a correct match. Thus, the similarity metric trained using this embodiment of deep similarity learning may provide a substantial improvement over previous similarity metrics for multimodal image data sets.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. A method for similarity metric learning for multimodal medical image data, the method comprising:
   receiving a first set of image data of a volume, wherein the first set of image data is captured with a first imaging modality;
   receiving a second set of image data of the volume, wherein the second set of image data is captured with a second imaging modality;
   aligning the first set of image data and the second set of image data;
   training a first set of parameters with a multimodal stacked denoising auto encoder to generate a shared feature representation of the first set of image data and the second set of image data, the multimodal stacked denoising auto encoder comprising a first layer with independent and parallel denoising auto encoders;
   training a second set of parameters with a denoising auto encoder to generate a transformation of the shared feature representation;
   initializing, using the first set of parameters and the second set of parameters, a neural network classifier;
   training, using training data from the aligned first set of image data and the second set of image data, the neural network classifier to generate a similarity metric for the first and second imaging modalities, the similarity metric identifying which voxels from the first set of image data that correspond to the same position in the volume as voxels from the second set of image data; and
   performing image fusion on the first set of image data and the second set of image data using the identified voxels.

2. The method of claim 1 wherein the first imaging modality is computed tomography and the second imaging modality is magnetic resonance.

3. The method of claim 1 wherein the aligning comprises rigidly aligning the first set of image data and the second set of image data.

4. The method of claim 1 wherein the aligning comprises sampling the first set of image data and the second set of image data to generate a plurality of positive training data sets and a plurality of negative training data sets.

5. The method of claim 1 wherein the multimodal stacked denoising auto encoder comprises:
   the first layer comprising a first denoising auto encoder and a second denoising auto encoder; and
   a second layer comprising a third denoising auto encoder.

6. The method of claim 5 wherein training the multimodal stacked denoising auto encoder comprises:
   training the first denoising auto encoder to generate a first feature vector from the first set of image data;
   training the second denoising auto encoder to generate a second feature vector from the second set of image data; and
   training the third denoising auto encoder to generate the shared feature representation from the first feature vector and the second feature vector.

7. The method of claim 1 wherein the neural network classifier is a five layer deep neural network classifier.

8. The method of claim 7 wherein initializing the neural network classifier comprises:
   initializing parameters in a first three layers of the neural network classifier with parameters from the multimodal stacked denoising auto encoder; and initializing parameters in a fourth layer of the neural network classifier with parameters from the denoising auto encoder.

9. The method of claim 8 wherein initializing the neural network classifier further comprises:
   initializing missing parameters in the neural network classifier with zeros.

10. A system comprising:
   a first scanner configured to capture a first set of image data of a volume with a first imaging modality;
   a second scanner configured to capture a second set of image data of the volume with a second imaging modality; and
   a processor configured to:
      receive, from the first scanner and the second scanner over a network, the first set of image data and the second set of image data;
      rigidly align the first set of image data and the second set of image data;
      train a first set of parameters with a multimodal stacked denoising auto encoder to generate a shared feature representation of the first set of image data and the second set of image data, the multimodal stacked denoising auto encoder comprising a first layer with independent and parallel denoising auto encoders;
      train a second set of parameters with a denoising auto encoder to generate a transformation of the shared feature representation;
      initialize, using the first set of parameters and the second set of parameters, a deep neural network classifier;
      train, using training data from the aligned first set of image data and the second set of image data, the deep neural network classifier to generate a similarity metric for the first and second imaging modalities, the similarity metric identifying which voxels from the first set of image data that correspond to the same position in the volume as voxels from the second set of image data; and
      performing image fusion on the first set of image data and the second set of image data using the identified voxels.

11. The system of claim 10 wherein the first imaging modality is computed tomography and the second imaging modality is magnetic resonance.

12. The system of claim 10 wherein the rigidly aligning comprises sampling the first set of image data and the second set of image data to generate a plurality of positive training data sets and a plurality of negative training data sets.

13. The system of claim 10 wherein the multimodal stacked denoising auto encoder comprises:
   the first layer comprising a first denoising auto encoder and a second denoising auto encoder; and
   a second layer comprising a third denoising auto encoder.

14. The system of claim 13 wherein training the multimodal stacked denoising auto encoder comprises:
   training the first denoising auto encoder to generate a first feature vector from the first set of image data;
   training the second denoising auto encoder to generate a second feature vector from the second set of image data; and
   training the third denoising auto encoder to generate the shared feature representation from the first feature vector and the second feature vector.

15. The system of claim 10 wherein the deep neural network classifier is a five layer deep neural network classifier.

16. The system of claim 15 wherein initializing the deep neural network classifier comprises:
   initializing parameters in a first three layers of the deep neural network classifier with parameters from the multimodal stacked denoising auto encoder; and
   initializing parameters in a fourth layer of the deep neural network classifier with parameters from the denoising auto encoder.

17. The system of claim 14 wherein initializing the deep neural network classifier further comprises:
   initializing missing parameters in the deep neural network classifier with zeros.

* * * * *